United States Patent [19]

Kragle

[11] Patent Number: 5,108,685
[45] Date of Patent: Apr. 28, 1992

[54] METHOD AND APPARATUS FOR FORMING AN ARTICLE WITH MULTI-CELLULAR DENSITIES AND/OR GEOMETRIES

[75] Inventor: Harry A. Kragle, Corning, N.Y.

[73] Assignee: Corning Incorporated, Corning, N.Y.

[21] Appl. No.: 628,008

[22] Filed: Dec. 17, 1990

[51] Int. Cl.⁵ .............................................. B29C 47/12
[52] U.S. Cl. ......................... 264/177.12; 425/192 R; 425/382 R; 425/463; 425/464
[58] Field of Search .................... 264/177.11, 177.12, 264/177.16; 425/192 R, 382 R, 463, 464

[56] References Cited

U.S. PATENT DOCUMENTS

| | | |
|---|---|---|
| 3,853,485 | 12/1974 | Hogan . |
| 4,168,944 | 9/1979 | Morikawa et al. ................ 425/464 |
| 4,448,828 | 5/1984 | Mochida et al. ................ 428/116 X |
| 4,798,526 | 1/1989 | Briggs et al. ............... 425/192 R X |
| 4,810,554 | 3/1989 | Hattori et al. ...................... 428/116 |

FOREIGN PATENT DOCUMENTS

| | | | |
|---|---|---|---|
| 62-104729 | 5/1987 | Japan .................................... 425/464 |
| 2095158 | 9/1982 | United Kingdom ................ 425/464 |

*Primary Examiner*—Leo B. Tentoni
*Attorney, Agent, or Firm*—Burton R. Turner; Richard N. Wardell

[57] ABSTRACT

Novel method and apparatus for forming a substrate or honeycomb article with multi-cellular densities and/or multi-cellular geometries by positioning a pair of extrusion dies adjacent one another, such that one surrounds the other, and such that discharge slots of one die produce different cellular densities and/or geometries from that of the other. Further, an annular batch reservoir is formed between the mating surfaces of such dies so as to facilitate the flow of batch material from one die to the other, and an integral inner skin is formed between the differing cellular structures.

20 Claims, 2 Drawing Sheets

METHOD AND APPARATUS FOR FORMING AN ARTICLE WITH MULTI-CELLULAR DENSITIES AND/OR GEOMETRIES

BACKGROUND OF THE INVENTION

This invention relates to the art of producing honeycomb structures from extrudable material such as particulate ceramic and/or metal batches and similar materials which have the property of being able to flow or plastically deform during extrusion, while being able to become sufficiently rigid immediately thereafter so as to maintain their structural integrity. More particularly, the present invention relates to an improved extrusion die assembly for forming a honeycomb structure having differing cell structures including differing geometries and/or cellular densities, across the width or face of the extruded honeycomb structure, while simultaneously providing an inner skin between the differing cells.

The prior art has suggested the use of various cell geometries in a cellular substrate; however, such art does not disclose the applicant's method of producing such structures or does it contemplate the unique concerns of the extrusion die apparatus of the present invention.

U.S. Pat. No. 3,853,485 relates to a core member for a catalytic oxidation converter, wherein the cross-sectional area of the cells or passages through the core member increase progressively from a central one of a plurality of patterns of passages toward the next concentric pattern of passages.

U.S. Pat. No. 4,168,944 relates to a complex apparatus for manufacturing a tubular honeycomb assembly with an adiabatic layer formed integrally on the peripheral wall thereof.

U.S. Pat. No. 4,448,828 relates to ceramic honeycomb structural bodies having flexible cells in the center to provide good thermal stress absorption, while outer rigid cells provide high mechanical strength. The patent relates to the structural body only, and not as to how it is formed.

U.S. Pat. No. 4,810,554 relates to a high strength ceramic honeycomb structure having triangular outer cells which improve the isostatic strength of square inner cells. Again, the patent relates to the cell shape, and not to the manufacture of such shape.

In order to overcome the problems and complexities of the above noted prior art, it is an object of the present invention to set forth a simple and relatively inexpensive method for providing an appropriate apparatus to produce an extruded article having multi-cellular densities and/or multi-cellular geometries.

SUMMARY OF THE INVENTION

In its simplest form, the present invention sets forth a new concept in extrusion die assemblies for forming honeycomb structures with various cell geometries and/or various cell densities across the width or face of the extruded honeycomb structure. In order to obtain the desired result, a composite die assembly is provided having two or more individual dies of differing cell densities and/or geometries. The adjacent dies are provided with mating surface portions, which not only complement one another to form a continuous die structure, but which also have bearing surface portions which utilize the pressures of extrusion to wedge or lock the adjacent die bodies together. Further, an annular reservoir is provided between the mating surfaces to collect and distribute batch material and thereby facilitate the continuity of batch flow through the feed holes of one die into those of an adjacent die, since there is no necessity that such feed holes be in alignment. Finally, the extrusion velocity of the various cell densities within the assembly is matched to insure the integrity and good knitting between the differing cell geometries and/or densities, by various means such as adjusting the feed hole diameter and/or length, which will vary the flow resistance in different parts of the assembly.

DESCRIPTION OF THE PREFERRED EMBODIMENTS

A typical extruded honeycomb structure is usually restricted to one cell geometry across the width of the extruded structure. That is, the geometric surface area, the open frontal area, the hydraulic radius and other attributes remain a constant across the face of the structure. Also, fluid flow through such structures show the classical bell-curve which is evident with flow within closed channels. However, some users of these honeycomb structures desire to have a choice in the magnitude and distribution of these characteristics, such as flattening out the pressure drop curve or slowing down the velocity peak in the mid area of the substrate.

Figure 1:
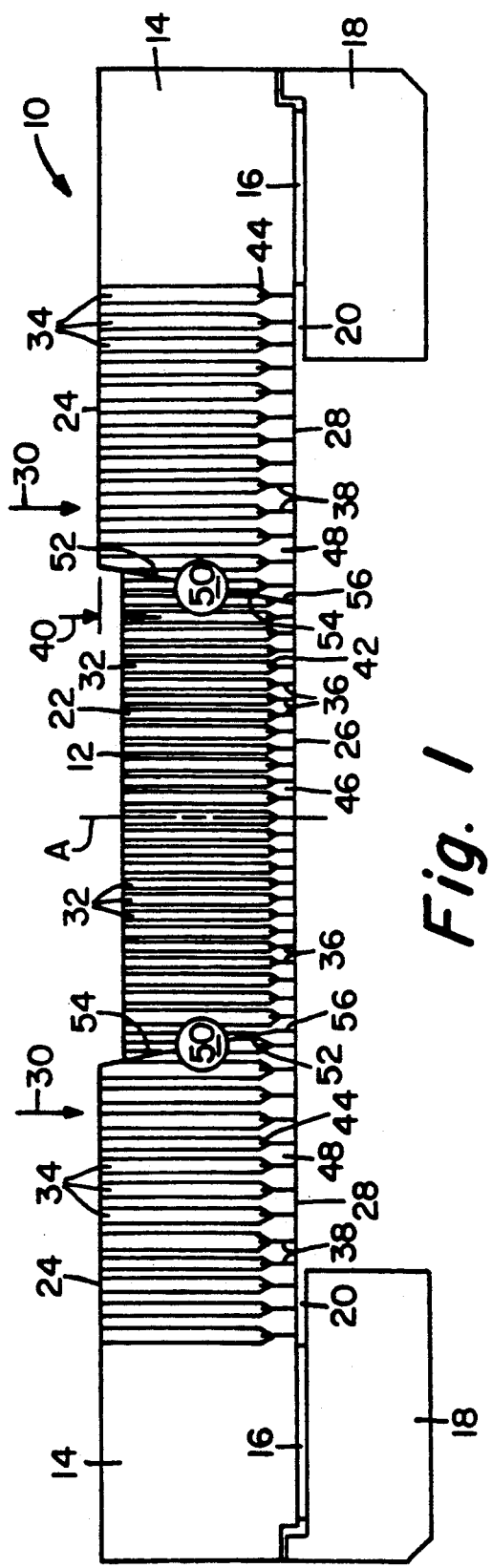
FIG. 1 is a schematic elevational view of an extrusion die assembly embodying the present invention.

Referring now to FIG. 1, a die assembly 10 is shown comprising a composite die having an inner or central die body 12 and an outer die body 14. The assembly is shown mounted with the traditional skin-forming hardware comprising a shim 16 and a mask 18, producing a skin-forming passage 20 between the outer die body 14 and the mask 18; however, any skin-forming method may be utilized with present die assembly. The central die body 12 and the outer die body 14 each have an inlet or feed hole face 22, 24, respectively, and an outlet or pin face 26, 28, respectively. The arrow 30 shows the direction of batch flow to and through the die assembly 10, which is parallel to the longitudinal axis A of the assembly. A plurality of feed holes 32 communicate with the inlet face 22 of the central die body 12, and a plurality of feed holes 34 communicate with the inlet face 24 of the outer die body 14. In a like manner, a plurality of interconnected discharge slots 36 communicate with the outlet or pin face 26 of the central die body, and a plurality of interconnected discharge slots 38 communicate with the outlet or pin face 28 of the outer die body. The distal or outlet ends 42 of the feed holes 32 communicate with the interconnected discharge slots 36 of central die body 12, whereas the distal or outlet ends 44 of the feed holes 34 communicate with the interconnected discharge slots 38 of outer die body 14.

It will be noted that the individual dies 12 and 14 of the composite die assembly 10 are provided with differing cell densities or cell geometries. That is, the discharge slots 36 of die body 12 are formed closer together so as to form smaller pins 46 therebetween, than the pins 48 formed between discharge slots 38 in die 14. Thus, as shown, the slot depth may also be varied between the two adjacent die bodies. Further, in view of the fact that the adjacent dies are provided with differing cell densities and/or geometries, the flow through the die bodies may be adjusted to balance the output flow velocities of the adjacent central and outer die bodies 12 and 14, respectively. As noted at 40, the height of one die body may be varied with respect to the adjacent die body. Accordingly, by reducing the height of central die body 12, the length of the feed holes 32 will be shorter than the length of the feed holes 34 in outer die body 14, thus varying the resistance to flow through the dies so as to provide the desired balanced output flow velocities of the adjacent die bodies.

Figure 2:
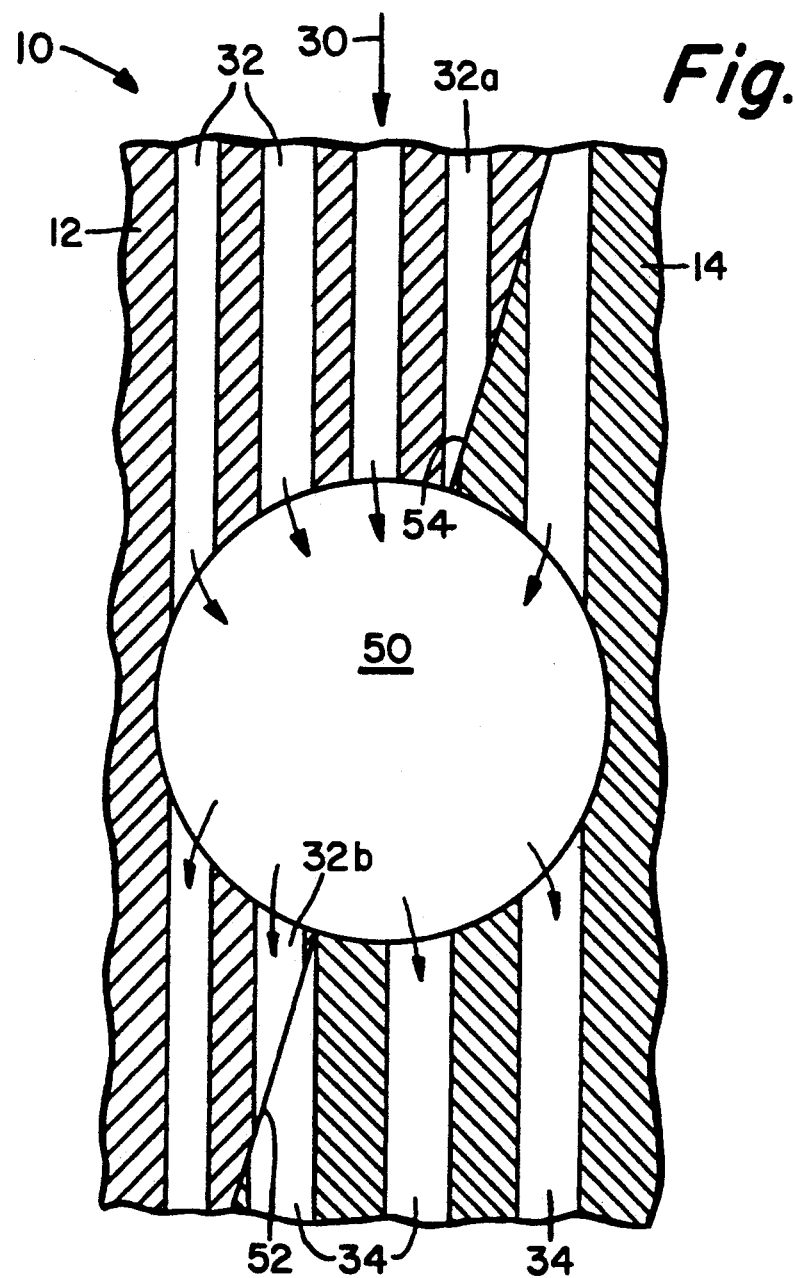
FIG. 2 is an enlarged fragmental elevational view in cross-section illustrating an annular batch reservoir area.

Referring now also to FIG. 2, the adjacent dies 12 and 14, are provided with mating surface portions 52 and 54, respectively. It is important that the adjacent dies be positioned against one another in such a manner so as not to be detrimentally affected by the pressures of extrusion. As shown in FIGS. 1 and 2, the mating surfaces 52, 54 are tapered in the form of a cone so that the greater the extrusion pressure, the greater the locking pressure between central die 12 and outer die 14.

An annular batch reservoir 50 is formed within the complementary conical mating surfaces 52, 54 of the adjacent die bodies 12, 14, respectively, in order to assure that batch material flows from the feed holes of one die body into the feed holes of the other die body adjacent the mating surfaces. Because of the dissimilarity of cell density or geometries in the two adjacent dies, the probability is very high that the feed holes 32 of the central die body 12 will not line up with the feed holes 34 of the die body 14 along the mating surfaces 52, 54, except by a rare coincidence in a few locations. The annular batch reservoir 50 permits the communication between the dissimilar feed hole patterns so as to collect batch material and supply such collected batch material to those discharge slots whose longitudinal axes intersect the mating surfaces. As shown, any upstream feed hole communicating with inlet faces 22 or 24, and which terminates at the reservoir 50, is a source of batch supply into the reservoir. Similarly, any downstream feed hole which intersects with the reservoir 50 is supplied with collected batch material from the reservoir.

FIG. 2 illustrates the misalignment of the feed holes in the outer die body 14 with respect to the central die body 12. For example, feed hole 32a, which is directly above the annular batch reservoir 50, may or may not contribute any flow of batch into the reservoir, depending upon its alignment with the feed holes 34 of die body 14. As shown, feed hole 32a does line up with a portion of a feed hole 34 so that some flow is possible into the reservoir 50, however, if there is no alignment of holes 32 and 34 along the mating surfaces 52, 54, then no flow is possible into the reservoir 50 with respect to such misaligned feed holes.

On the downstream side, it is seen that the reservoir 50 communicates with a feed hole 32b directly beneath it. However, if the location of feed hole 32b does not coincide, even partially, with that of the feed hole 34 immediately below it, then no flow can take place. Instead, the hole 32b will initially fill up with batch which then becomes stagnant and becomes non-contributory as regards to the delivery of batch to the pin face.

Although the reservoir 50 has been shown as having a circular cross-sectional shape, such shape was selected mainly in the interest of simplifying the machining process. It is within the province of the present invention that other shapes which satisfy the averaging requirements of batch flow to the outlet face of the die are equally acceptable. The annular batch reservoir 50 functions as a distributor such that batch which flows into the reservoir from either die will enter a collection zone of commonality, and the collected batch in the reservoir can then easily flow into the feed holes of the second die in communication with the reservoir, wherever they may be and even though they are not in alignment with the feed holes of the mating die.

FIG. 2 not only illustrates the fact that the feed holes in the adjacent dies need not be aligned adjacent the mating surfaces, but also the fact that the feed holes in the adjacent dies may be of different diameters and different spacings relative to one another, depending upon the desired cell densities or geometries to be produced, and the necessity of providing a balanced discharge velocity of batch flow from the outlet faces 26 and 28.

Referring again to FIG. 1, an annular skin-forming gap or recess 56 is provided in at least one mating surface between the adjacent dies in communication with the outlet face, for simultaneously forming an adequate skin in the extruded honeycomb structure between the two differing cell densities and/or geometries as they are extruded by the adjacent die bodies. Although the skin-forming recess 56 is primarily fed with batch material, from the longitudinal feed holes communicating with the annular batch reservoir 50, it is also fed transversely from the interconnected discharge slots 36, 38.

Figure 3:
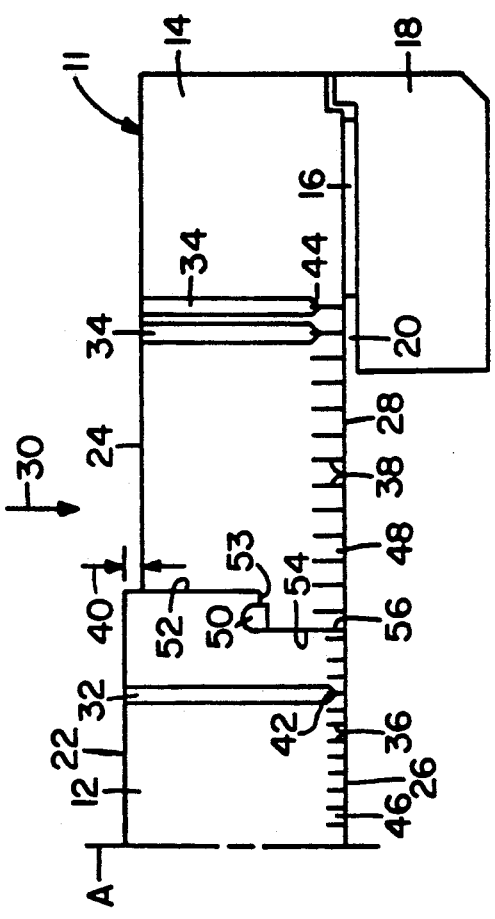
FIG. 3 is a schematic fragmental view of a further embodiment of the extrusion die assembly of the present invention.

Referring now to FIG. 3, a further embodiment of a die assembly 11 is shown, which is similar to the die assembly 10 shown in FIG. 1, with the exception that mating surfaces 52, 54 of die bodies 12, 14, respectively, are not tapered but have a stepped bearing surface 53 therebetween. Hereagain, the extrusion pressure created by the direction of batch flow 30 securely holds and locks the die body 12 in operable engagement with the die body 14. Although the central die body 12 is preferably designed to be removeable and interchangeable with an outer die body such as 14, it can be permanently joined to the surrounding die segment if desired, such as by welding or brazing, and accordingly a mechanical locking mechanism such as the taper of FIG. 1 or the stepped bearing surface of FIG. 3 would not be required. However, the interchangeability of a central die body with respect to an outer die body permits a variety of possible combinations of extruded honeycomb structures, without dedicating the combination die to a single arrangement. The conical nesting of the two die bodies as shown in FIG. 1 is ideal for dual density products when the inner element is round. However, for non-round or irregularly shaped inserts, the conical geometry may prove difficult to generate. Accordingly, for these instances, the alternative shown in FIG. 3 is definitely more practical. Further, as shown in FIG. 3, the annular batch reservoir may assume a different cross-section from the circular cross-section shown in FIG. 1, but its role as an averaging mechanism for batch flow to the discharge slots is the same as described with respect to that shown in FIG. 1. As also noted in FIG. 3, the height differential 40 between the inner or central die body 12 and the outer die body 14 may be reversed from that shown in FIG. 1, such that the central die body is provided with a greater height or thickness than that of the outer die body.

Figure 4:
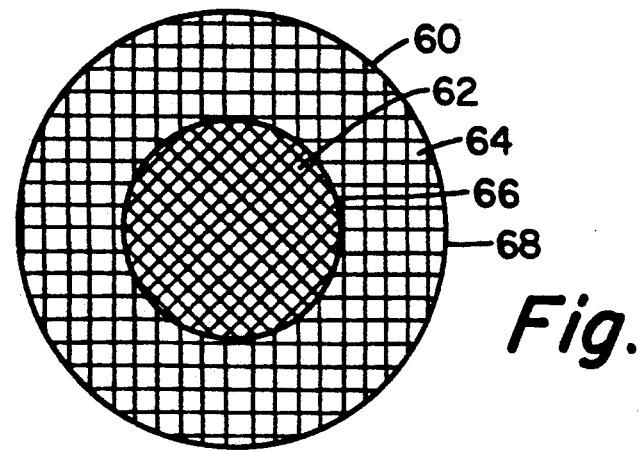
FIG. 4 is a schematic illustration of the face of an extruded article which may be produced by the present invention.

Although many different cell geometries and/or cell densities may be produced with the present invention, FIG. 4 illustrates one example of the face of a cellular substrate or honeycomb structure 60 which may be produced utilizing the present composite die assembly. As shown, the honeycomb structure 60 comprises an inner or core cellular portion 62 of one cell density and cell orientation surrounded by an outer or bounding cellular portion 64 of lesser cell density and a different cellular orientation, with an inner skin 66 formed therebetween and an outer skin 68 formed about the outer cellular portion 64. FIG. 4 might be considered to illustrate an embodiment having an inner core portion 62 provided with a square cellular geometry oriented 45° to the outer cells and having a cellular density of 300 cells per square inch, and an outer cellular portion 64 provided with a square cellular geometry having a cell density of 200 cells per square inch and oriented at an angle of 45° to the core cells, with an intermediate skin 66 between the two different cell densities, and an outer skin 68.

Such a cell orientation as shown in FIG. 4 provides the substrate with improved strength in the green state. That is, the weakest axis of a square-celled substrate always lies laterally across the diagonals. As shown in FIG. 4, when the webs of the inner and outer cellular portions are at 45° to each other, the weak axis no longer extends across the entire diameter or face of the substrate. That is, when the outer cells are at their weakest, the inner cells are at their strongest, and thus are able to strengthen the part as a whole. Conversely, when the inner cells are oriented at their weakest position, the outer cells form a stronger enclosure to provide adequate support. It will of course be understood, that cell geometries other than square may be utilized and that various orientations of the cells and cell densities may be incorporated.

The present invention provides a simple and inexpensive method of extruding a honeycomb structure or cellular substrate having multiple-density cells and/or multiple geometric configurations. Although only two dies have been shown in the drawings, it will be evident that a greater number of dies with various densities may be combined to produce a substrate of additional variations between the adjacent die bodies. Although it is preferred that the multiple die bodies be concentric about longitudinal axis A, asymmetrical configurations may be utilized if desired, provided that the extrusion velocity of such assymetrical configuration is matched to insure the integrity between the various cell geometries. As previously mentioned, the extrusion velocity of the batch material flowing through adjacent die bodies having differing cell densities, must be matched so as to insure not only the integrity of the cells therewithin, but also good knitting between the honeycomb portion of one cell density with that of the adjacent cell density and the intermediate skin formed therebetween. The flow of the batch material can be matched, as previously stated by increasing the feed hole diameter in the die which flow lags the other, or the feed hole length can be adjusted by reducing the thickness of such die.

It is understood that the combination of dies of discrete cellular geometries and/or cell densities will provide a step effect across the diameter of the extruded part, rather than a graded effect. However, due to the simplicity of the method disclosed herein, compared to the extreme difficulty of fabricating a die of constantly changing cell geometry and/or cell density, the present invention offers a most economical and attractive alternative to a true graded approach.

In operation, a central die body is provided having an inlet face and an outlet face such that the inlet face communicates directly with a plurality of feed holes and the outlet face communicates directly with a plurality of interconnected discharge slots having a spacing and geometry to produce a honeycomb structure having a first cell density and a first cell geometry. Also, a bounding or outer die body is provided having an inlet face and an outlet face with the inlet face in direct communication with a plurality of feed holes and an outlet face in direct communication with a plurality of interconnected discharge slots having a spacing and geometry to produce a cellular structure having a second cell density and/or a second cell geometry different from that of the first cell density or geometry. The central die body is positioned within the bounding die body such that mating surface portions therebetween tend to securely lock the die bodies together under extrusion pressures, and an annular batch reservoir is formed in the mating surfaces and between the adjacent die bodies. In addition, a skin-forming recess is formed in at least one of the mating surface portions adjacent the outlet face of the die assembly.

The batch material is directed longitudinally through the die assembly by means of the feed holes communicating with the inlet face thereof. The feed holes communicate at their distal end with the interconnected discharge slots formed in the outlet face of the die assembly and the batch material flows longitudinally and laterally within such slots to form a unitary grid of batch material which is discharged therefrom. A plurality of the feed holes open to the inlet face communicate with the annular batch reservoir, supplying batch material thereto which is collected therein, and a plurality of feed holes communicating at their distal end with interconnected discharge slots in longitudinal alignment with the mating surfaces, also communicate with said annular batch reservoir to supply batch material from that collected in the reservoir to such interconnected discharge slots and to the skin-forming recess, for simultaneously forming an inner skin between the cellular structures formed by the adjacent die bodies. In order to insure the integrity of the extruded cellular structures and provide good knitting between the varied cell densities and the intermediate skin, the extrusion velocity of the batch material through the adjacent die bodies is adjusted by varying the feed hole diameter or feed hole length to provide a balanced output flow from the adjacent die bodies. Further, an exterior skin may be formed about the outer cellular structure by any conventional manner.

Although the now preferred embodiments of the invention have been disclosed, it will be apparent to those skilled in the art that various changes and modifications may be made thereto without departing from the spirit and scope of the invention as set forth in the appended claims.

I claim:

1. A method of extruding an article with multi-cellular structures which comprises:
   flowing batch material within flow paths of given diameter and length longitudinally through a die assembly having adjacent die body portions;

discharging batch material from one of said die body portions and forming a first cellular portion with a first cell density and geometry structure;

discharging batch material from an adjacent die body portion and forming a second cellular portion with a different cell structure;

collecting a portion of said batch material flowing through said die assembly within a reservoir formed between said adjacent die body portions;

flowing such collected batch material from said reservoir for discharge from said die assembly in longitudinal alignment with mating surface portions of said adjacent die body portions; and forming an inner skin between said first and second cellular portions as said cellular portions are simultaneously discharged from said die body portions.

2. A method of extruding an article as defined in claim 1 including the step of forming an outer skin on an outer periphery of the outermost of said first and second cellular portions.

3. A method of extruding an article as defined in claim 1 including the step of forming said inner skin primarily from the flow of batch material from said reservoir.

4. A method of extruding an article as defined in claim 1 including the step of adjusting the flow of batch material through said one die body portion and said adjacent die body portion so as to balance the discharge flow velocities from said die body portions.

5. A method of extruding an article as defined in claim 4 including the step of adjusting the flow of batch material by varying the diameter of the flow paths through one die body portion relative to the other die body portion.

6. A method of extruding an article as defined in claim 4 including the step of adjusting the flow of batch material by varying the length of the flow paths through one die body portion relative to the other die body portion.

7. A method of extruding a unitary honeycomb structure having a portion with a cell structure of one density and geometry, and an adjacent portion with a different cell structure including a difference in at least one of cell density and cell geometry which comprises:

providing a first die body having an inlet face, an outlet face, a plurality of feed holes of desired diameter and length in direct communication with said inlet face, and interconnected discharge slots, communicating with said feed holes, formed in said outlet face with a spacing and geometry for producing a honeycomb structure portion of one cell density and geometry;

providing a second die body having an inlet face, an outlet face, a plurality of feed holes of desired diameter and length in direct communication with said inlet face, and interconnected discharge slots, communicating with said feed holes, formed in said outlet face with a spacing and geometry for producing a honeycomb structure portion with a different cell structure;

positioning said first and second die bodies adjacent one another in contact with mating surface portions therebetween, and forming both a batch reservoir and a skin-forming recess between said mating surface portions;

flowing batch material into the entrance of said feed holes at the inlet face of said first and second die bodies and longitudinally through said bodies;

discharging said batch material at a desired flow velocity from the interconnected discharge slots of said first die body to form a first honeycomb structure portion of one cell density and geometry;

discharging said batch material at a desired flow velocity from the interconnected discharge slots of said second die body to form a second adjacent honeycomb structure portion of a different cell structure; and simultaneously with the discharge of said first and second honeycomb structure portions from said die bodies, forming an inner skin therebetween and joining said honeycomb structure portions together into a unitary honeycomb structure having multi-cellular structures.

8. A method of extruding a unitary honeycomb structure as defined in claim 7 including the steps of collecting a portion of said flowing batch material from said feed holes within said batch reservoir, and utilizing at least a portion of said collected batch material to supply batch flow to feed holes of the adjacent die which communicate therewith for flow to said discharge slots formed in said outlet face which are in longitudinal alignment with said mating surface portions between said adjacent die bodies.

9. A method of extruding a unitary honeycomb structure as defined in claim 7 including the steps of forming said batch reservoir between said mating surface portions intermediate said inlet and outlet faces, and forming said skin-forming recess between said mating surface portions adjacent an outlet face.

10. A method of extruding a unitary honeycomb structure as defined in claim 7 including the step of adjusting the flow of batch material longitudinally through said first and second die bodies so as to balance the output flow velocities of the extruded material from said die bodies.

11. A method of extruding a unitary honeycomb structure as defined in claim 10 including the step of adjusting the flow of batch material through said first and second die bodies by varying at least one of the diameter and length of the feed holes through one die body relative to the other die body.

12. A method of extruding a unitary honeycomb structure as defined in claim 7 including the step of positioning said first die body within said second die body such that said second die body surrounds said first die body, and forming conical mating surfaces therebetween.

13. Apparatus for forming a unitary honeycomb structure with multi-cellular structures which comprises:

first extrusion die means for forming a first honeycomb structure having a cell structure with a desired density and cell geometry;

second extrusion die means for forming a second honeycomb structure having a cell structure different from that of said first honeycomb structure;

means for securely maintaining said first and second extrusion die means in a mating surface relationship adjacent one another;

batch reservoir means formed between said adjacent extrusion die means for supplying batch material from one of said die means to the other; and means for forming an inner integral skin between said first and second honeycomb structures for joining them together as a unitary honeycomb structure with multi-cellular structures.

14. Apparatus for forming a unitary honeycomb structure as defined in claim 13 wherein said first extrusion die means is in the form of a central die body, and said second extrusion die means is in the form of an outer die body which surrounds said central die body.

15. Apparatus for forming a unitary honeycomb structure as defined in claim 14 wherein said batch reservoir means has an annular configuration extending about said central die body between the mating surfaces formed between said central die body and said outer die body.

16. Apparatus for forming a unitary honeycomb structure as defined in claim 14 wherein the mating surfaces are in the form of a pair of complementary conical surfaces formed between an outer periphery of said central die body and an inner periphery of said outer die body so as to form a locking engagement therebetween upon an application of extrusion pressures.

17. Apparatus for forming a unitary honeycomb structure as defined in claim 13 including means for forming an outer skin about an outer periphery of said second honeycomb structure.

18. Apparatus for forming a unitary honeycomb structure as defined in claim 13 wherein said means for maintaining the first and second extrusion die means in mating relationship adjacent one another includes a pair of mating surface means formed on said extrusion die means for securely maintaining said first and second die means in a mating relationship adjacent one another when said die means are subjected to an extrusion pressure.

19. Apparatus for forming a unitary honeycomb structure as defined in claim 13 wherein both said first and second extrusion die means have feed hole means communicating directly with inlet faces of said die means and terminating with inner sections of interconnected discharge slots formed in outlet faces of said die means.

20. Apparatus for forming a unitary honeycomb structure as defined in claim 15 wherein said annular batch reservoir has a circular cross-sectional shape.

* * * * *